(12) United States Patent
Villarreal Rodriguez

(10) Patent No.: US 10,988,188 B2
(45) Date of Patent: Apr. 27, 2021

(54) OVERTURN CONTROL BY SIDE SUPPORT

(71) Applicant: Continental Automotive Systems, Inc., Auburn Hills, MI (US)

(72) Inventor: Daniel Villarreal Rodriguez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 209 days.

(21) Appl. No.: 16/217,637

(22) Filed: Dec. 12, 2018

(65) Prior Publication Data

US 2020/0189670 A1     Jun. 18, 2020

(51) Int. Cl.
| | | |
|---|---|---|
| *B62D 49/08* | (2006.01) | |
| *A01D 75/18* | (2006.01) | |
| *A01B 76/00* | (2006.01) | |
| *B62D 49/06* | (2006.01) | |

(52) U.S. Cl.
CPC .............. *B62D 49/08* (2013.01); *A01B 76/00* (2013.01); *A01D 75/18* (2013.01); *B62D 49/06* (2013.01)

(58) Field of Classification Search
CPC ........ B62D 49/08; B62D 49/06; A01B 76/00; A01D 75/18
See application file for complete search history.

(56) References Cited

U.S. PATENT DOCUMENTS

| | | | | |
|---|---|---|---|---|
| 2,561,444 A | * | 7/1951 | Martin ................... | B62D 49/08 280/755 |
| 2,740,538 A | * | 4/1956 | Felkner .................. | B66C 23/80 212/304 |
| 2,973,209 A | * | 2/1961 | Shaw ..................... | B62D 49/08 280/755 |
| 3,160,284 A | * | 12/1964 | Moore ................... | B62D 49/08 212/279 |
| 3,310,181 A | * | 3/1967 | Symmank .............. | B62D 37/00 280/764.1 |
| 3,501,021 A | * | 3/1970 | Brown ................... | B66C 23/76 212/196 |
| 3,763,956 A | * | 10/1973 | Ruff ....................... | B62D 49/08 180/283 |
| 3,802,720 A | * | 4/1974 | Ellis ...................... | B60R 21/131 280/755 |
| 3,901,395 A | * | 8/1975 | King ...................... | E02F 9/085 414/694 |
| 4,050,319 A | * | 9/1977 | Stanley ................. | F16H 25/2266 74/424.92 |
| 4,453,739 A | * | 6/1984 | Torras ................... | B62D 49/08 188/5 |
| 4,515,520 A | * | 5/1985 | Parquet .................. | E02F 9/085 212/304 |
| 4,815,756 A | * | 3/1989 | Kitner ................... | B62H 1/10 180/215 |

(Continued)

FOREIGN PATENT DOCUMENTS

GB          1465289       *    2/1977   ............... B60S 9/10

OTHER PUBLICATIONS

Galkin et. al., SU1063664A, published Dec. 1983, all pages. (Year: 1983).*

*Primary Examiner* — Calvin Cheung

(57) ABSTRACT

The tipping of a tractor operating on an inclined surface is prevented by deploying a sideways moving stabilizer before the tractor's inclination angle is too low and below which the tractor will tip over.

3 Claims, 3 Drawing Sheets

(56) References Cited

U.S. PATENT DOCUMENTS

| | | | | |
|---|---|---|---|---|
| 4,861,069 A * | 8/1989 | Gunter | E02F 9/18 | 280/758 |
| 5,025,720 A * | 6/1991 | Bates | A01D 85/001 | 100/100 |
| 5,125,787 A * | 6/1992 | Ball | E02F 3/388 | 212/347 |
| 6,023,220 A * | 2/2000 | Dobler | B60Q 1/52 | 340/440 |
| 6,394,738 B1 * | 5/2002 | Springer | B62D 49/08 | 187/232 |
| 9,915,396 B2 * | 3/2018 | Castro Salinas | B66F 11/044 | |
| 2001/0029438 A1 * | 10/2001 | Tobaru | B60W 40/112 | 702/151 |
| 2003/0213636 A1 * | 11/2003 | Feldman | B60R 99/00 | 180/282 |
| 2003/0222447 A1 * | 12/2003 | Powell | B62D 49/085 | 280/759 |
| 2004/0128060 A1 * | 7/2004 | Park | B60W 30/04 | 701/124 |
| 2005/0080544 A1 * | 4/2005 | Suzuki | B60R 21/0132 | 701/70 |
| 2008/0019815 A1 * | 1/2008 | Harris | B66C 23/80 | 414/563 |
| 2009/0235724 A1 * | 9/2009 | Ryu | G01M 1/122 | 73/65.01 |
| 2009/0263222 A1 * | 10/2009 | Kuriakose | B60P 3/12 | 414/563 |
| 2011/0022267 A1 * | 1/2011 | Murphy | B60W 30/04 | 701/38 |
| 2011/0127757 A1 * | 6/2011 | Forini | B66C 23/80 | 280/755 |
| 2013/0074377 A1 * | 3/2013 | Colbert | E02F 3/32 | 37/403 |
| 2013/0328295 A1 * | 12/2013 | Borghi | B66C 23/80 | 280/765.1 |
| 2014/0265283 A1 * | 9/2014 | Clifton | G09B 9/042 | 280/755 |
| 2016/0250959 A1 * | 9/2016 | Blanchard | B60P 1/5423 | 414/549 |
| 2019/0017248 A1 * | 1/2019 | Okada | G01M 1/122 | |
| 2019/0047831 A1 * | 2/2019 | Moose | B66C 23/36 | |
| 2019/0234048 A1 * | 8/2019 | Zhou | E02F 9/2228 | |
| 2020/0156906 A1 * | 5/2020 | Ferrer Morancho | B66C 23/80 | |
| 2020/0172087 A1 * | 6/2020 | Shur | E02F 9/262 | |

* cited by examiner

OVERTURN CONTROL BY SIDE SUPPORT

BACKGROUND

As used herein, the word "tractor" refers to a four-wheeled or tracked vehicle used especially for drawing farm equipment. Tractors are commonly used to pull implements that includes harvesters, tillage equipment, planters and the like.

It is well known that the weight of the tractor itself can cause the tractor and implements attached to it to overturn when the tractor is used on sloping terrain. An apparatus that would prevent or reduce the likelihood of overturning a tractor and attached implements when they are used on sloping terrain would be an improvement over the prior art.

DETAILED DESCRIPTION

Figure 1:
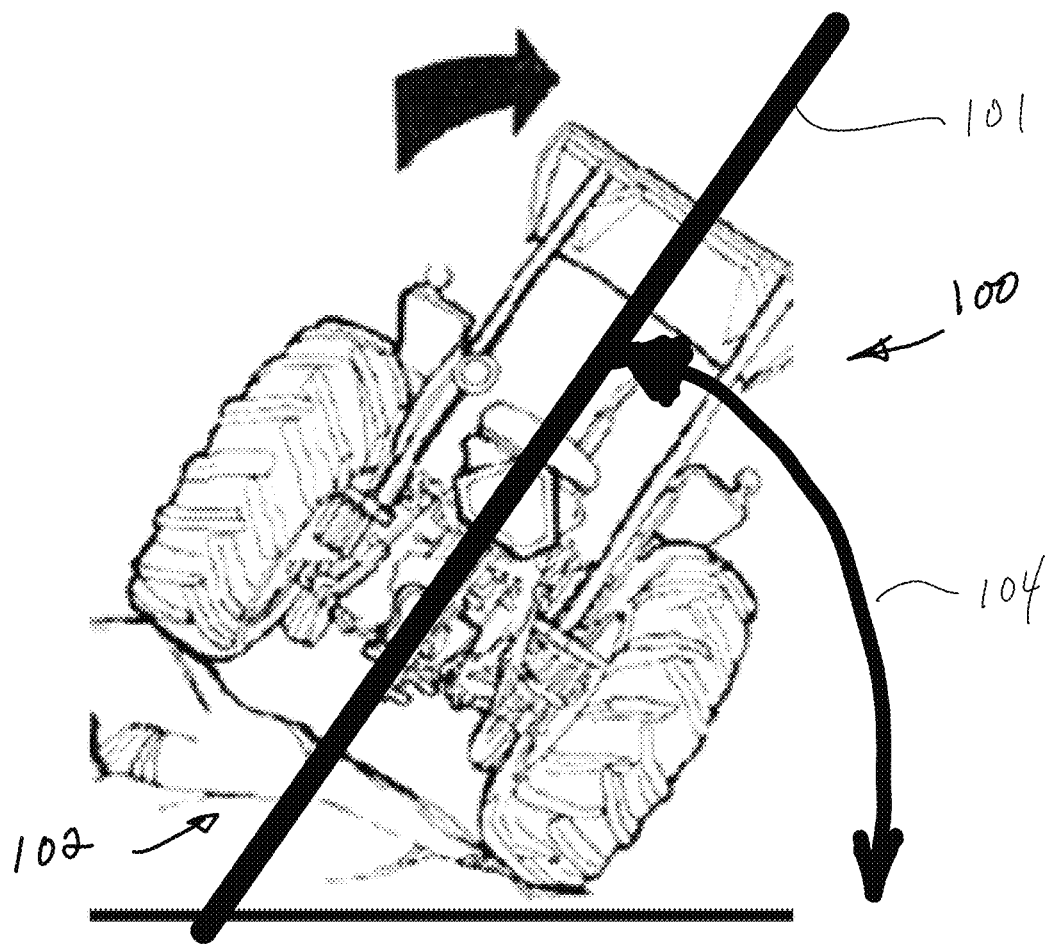
FIG. 1 is a rear-end view of a tractor on sloping terrain and depicting its imminent overturning.

FIG. 1 is a rear end-view of a tractor 100 on a sloped terrain 102 and showing the tractor 100 inclined at an angle 104 relative to horizontal. It is well known that as the terrain 102 increases its elevation on the left hand side of the tractor 100, the angle 104 will decrease. A some angle 104, the tractor will tip over or overturn.

Figure 2:
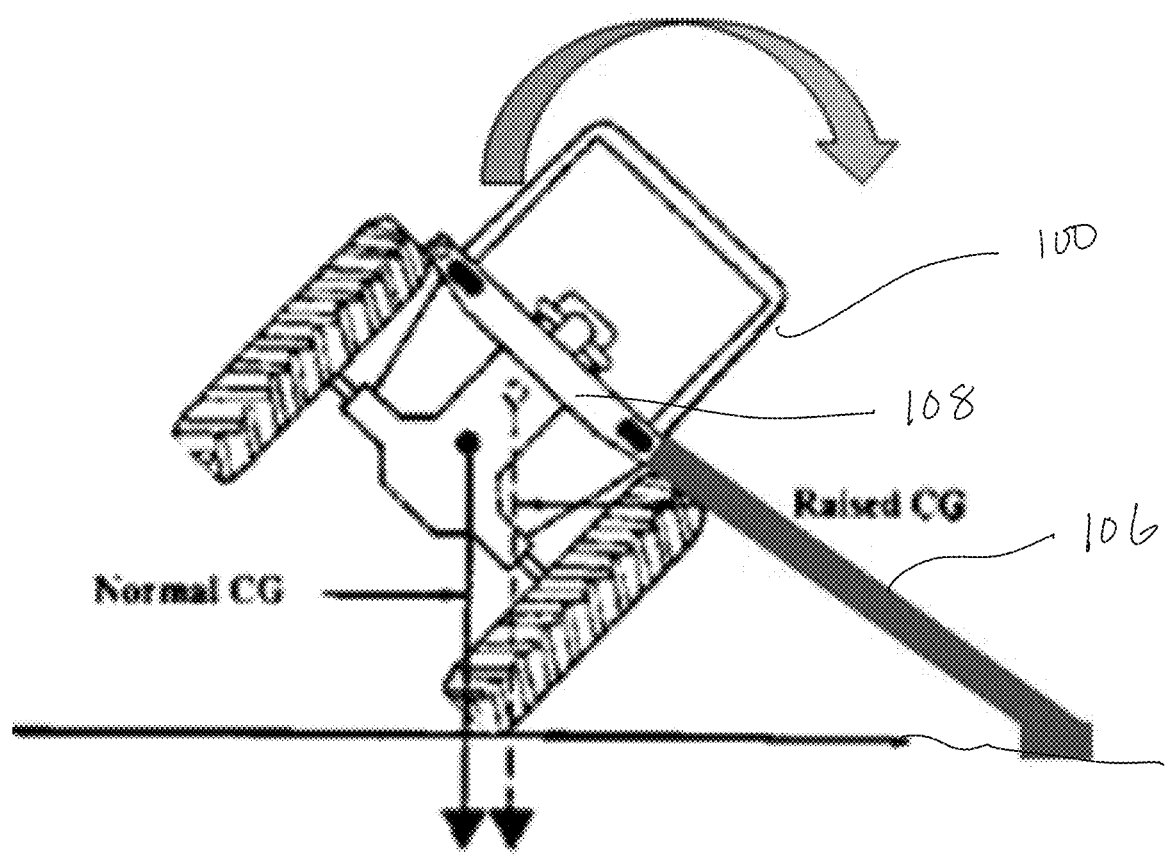
FIG. 2 depicts the rear-end view of a tractor and an overturn controlling stabilizer, which prevents the tractor from overturning.

FIG. 2 depicts the rear-end view of the tractor 100 with a lateral stabilizer 106 deployed from the right-hand side of the tractor 100 extending rightwardly from a storage bin or fender 108. The stabilizer 106 is extended automatically responsive to the detection of an angle 104 below which the tractor's stability and center of gravity are such that the vehicle will turn over. The detection of that particular angle will be device-specific but nevertheless detected by the apparatus shown in FIG. 3.

Figure 3:
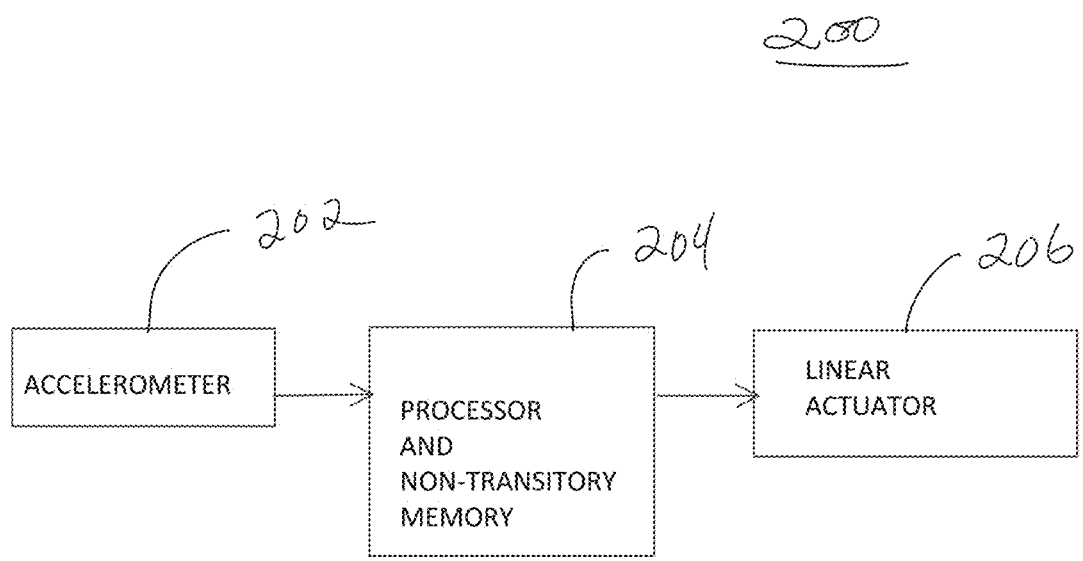
FIG. 3 is a block diagram of an apparatus that prevents overturning a tractor, such as the one depicted in FIG. 1 and FIG. 2.

Referring now to FIG. 3, an apparatus 200 for preventing the overturning of the tractor shown in FIG. 1 and FIG. 2 is shown. The apparatus 200 is part of the tractor and preferably included in or located with an engine control unit as those of ordinary skill in the art will recognize.

A prior art accelerometer 202 has an output which is a signal representing the angle of inclination 104 at which the tractor is pitched by its operation on an inclined surface 102. The signal output from the accelerometer 202 is provided to a processor 204 which has an included non-transitory memory that stores program instructions for the processor 204. Those program instructions evaluate the output signal from the accelerometer 202 and determine the angle 104 at which the tractor 102 is being operated. Upon the detection that the tractor's angle 104 is approaching the angle at which the tractor will tip over, the processor 204 generates an output signal to a linear actuator 206. The linear actuator is thus actuated prior to the inclination angle 104 being less than the angle at which the tractor will tip over. The deployment of the stabilizer 106 before the critical angle is reached thus prevents the tractor 100 from tipping over.

The linear actuator 206 is coupled to the stabilizer 106 and causes the stabilizer's deployment in either a right hand or left hand direction as needed by the tractor's operation. Put simply, the linear actuator 206 thrusts the stabilizer outwardly from the tractor, preventing the tractor from tipping over.

In the preferred embodiment, the linear actuator can be either a hydraulic pump coupled to one or more pistons or a motor, the output shaft of which is provided a pinion that drives a rack gear on a telescoping piston. In either embodiment, operation of the linear actuator causes the stabilizer to extend laterally from the tractor preventing it and preferably equipment attached to the tractor from tipping over.

The foregoing description is for purposes of illustration only. The true scope of the invention is set forth in the following claims.

What is claimed is:

1. A tractor comprising:
    an accelerometer, which is configured to generate an output signal that represents a sideways inclination angle of the tractor relative to horizontal;
    a processor coupled to the accelerometer and coupled to a non-transitory memory device that stores executable program instructions for the processor, said executable program instructions causing the processor to output a control signal when the sideways tractor's inclination angle is greater than a first predetrmined threshold and less than a second predetermined threshold value below which the tractor will tip over;
    a linear actuator coupled to the processor and receiving the control signal from the processor; and
    a lateral stabilizer coupled to the linear actuator wherein the linear actuator actuates the lateral stabilizer to extend outward and away from the tractor either rightward or leftward, responsive to the control signal provided to the linear actuator by the processor.

2. The tractor of claim 1, wherein the linear actuator is hydraulic.

3. The tractor of claim 1, wherein the linear actuator comprises a rack and pinion.

* * * * *